Feb. 9, 1960 A. MAZEIKA 2,924,009
METHOD OF SECURING A HOSE NOZZLE OR TUBE FITTING TO A HOSE END
Filed Oct. 28, 1957
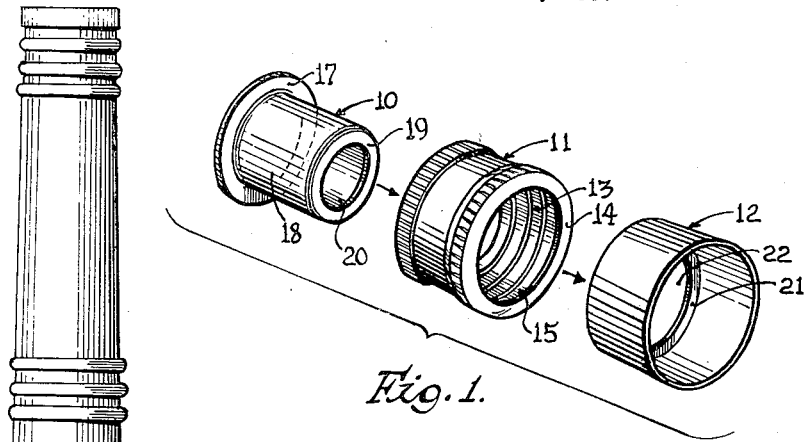
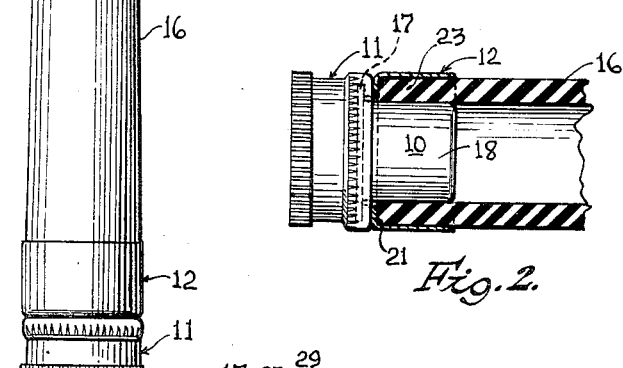
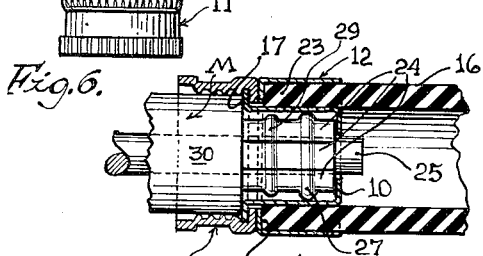
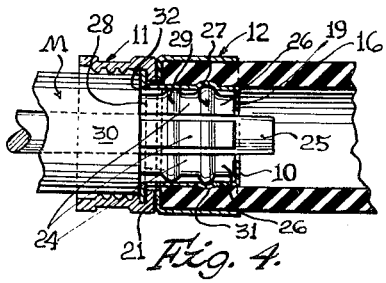
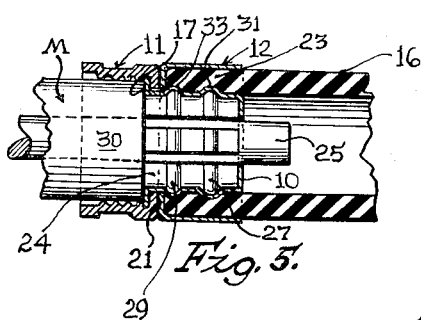
INVENTOR.
ALBERT MAZEIKA
BY
HIS ATTORNEYS.

United States Patent Office 2,924,009
Patented Feb. 9, 1960

2,924,009

METHOD OF SECURING A HOSE NOZZLE OR TUBE FITTING TO A HOSE END

Albert Mazeika, Chicago, Ill., assignor to Milton Manufacturing Co., Inc., Chicago, Ill., a corporation of Illinois Application October 28, 1957, Serial No. 692,654

1 Claim. (Cl. 29—507)

This invention relates to a hose nozzle or tube fitting and the method of securing the same to the nozzle or tube.

As such the invention has for an object the provision of a simplified method and construction for economically and for practical purposes connecting the fitting to the end of the nozzle tube, insuring a permanent, durable and fluid-tight joint.

Another and equally important object of the invention is the method and construction employed for securing the end portion of the hose nozzle or tube between the cylindrical body of a valve cup and a ferrule, the latter encircling the end of the hose nozzle or tube.

Yet another and equally important object of the invention is the provision of an improved method for the purposes hereinafter more fully described wherein but a single continuous operation is employed for connecting the fitting to the end of the hose nozzle or tube, thus resulting in mass production at an economical cost, permitting sale of the assembled unit at an attractive selling price.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of the fitting embodied in the invention prior to assembly, with the parts thereof in exploded relation;

Fig. 2 is a fragmentary longitudinal sectional detail view of the fitting in its first step of assembly to the end of a hose nozzle or tube;

Fig. 3 is a fragmentary sectional detail view of the same showing the assembly mounted upon a mandrel or expanding tool;

Fig. 4 is a fragmentary sectional detail view similar to Fig. 3 showing a partial operation of the mandrel;

Fig. 5 is a fragmentary sectional detail view similar to Fig. 4 showing the completed expanding operation of the mandrel;

Fig. 6 is a side elevational view of a hose nozzle including my improved fitting associated therewith.

The preferred form of construction and method of my invention are best understood by reference to the accompanying drawings in which the fitting comprises three parts, namely, a valve cup 10, a coupler 11, and a ferrule 12. Each of these parts is preferably a stamping.

The coupler 11 has an internally threaded surface 13 by means of which the coupler is threaded upon the threaded nipple of a hose or the like. The coupler 11 at one end thereof includes an inturned flange 14 defining an opening 15.

The valve cup 10 is so termed because it houses a valve member (not shown) which controls the flow of water or liquid through the nozzle 16. Such valve cup at one end includes an outwardly turned flange 17 formed as an integral part of a cylindrical body 18 having at its opposite end portion an inturned flange 19 defining an opening 20. The outside diameter of the cylindrical body 18 of the cup valve 10 is slightly smaller than the diameter of the opening 15 whereby the valve cup may be projected through the opening 15 with its flange 17 bearing upon the flange 14 of the coupler 11. The ferrule 12 at one end provides an inturned flange 21 defining an opening 22 of a diameter to permit projection of the cylindrical body 18 into the ferrule 12 in spaced relation with respect to the cylindrical walls of the latter. In such position, the flange 21 of the ferrule 12 will bear against the flange 14. The end portion 23 of the nozzle tube 16 is projected into the ferrule 12 with the cylindrical body 18 of the valve cup 10 projecting into the end portion 23.

The assembly now takes the appearance shown in Fig. 2 and is ready for operation upon by the mandrel M. The mandrel may be of any approved construction including expandible segments 24 through which extends a tapered expanding shaft 25. The segments 24 adjacent the end 26 thereof together provide a circumferentially extending rib 27. The segments adjacent the end 28 thereof together also provide a circumferentially extending rib 29. The outside diameter of the circumferential rib 27 is greater than the rib 29.

The tapered shaft 25, as before indicated, may be moved longitudinally with respect to its long axis under pneumatic power.

The assembly as shown in Fig. 2 is mounted on the mandrel M with the coupler 11 encircling the sleeve 30 and with the valve cup 10 embracing the expandible segments 24 with the flange 17 abutting the end of the sleeve 30. The initial movement of the shaft 25 to initiate expansion of the segments 26 will cause the rib 27 to expand the adjacent portion of the body 18 of the valve cup 10 to form therein a locking rib 31. The forming of this rib 31 accomplishes a two-fold purpose: In the first place it expands the end portion 23 of the nozzle tube laterally to the left as viewed in Fig. 4, thereby compressing the end 32 of the end portion 23 of the tube 16 between the locking rib 31 and the flange 21; and secondly it locks the end portion 23 of the tube 16 between the ferrule 12 and the rib 31 to prevent longitudinal movement of the end portion 23 away from the flange 21 or to the right as viewed in Fig. 4.

By continuous movement of the shaft 25, rib 29 will cause a sealing rib 33 to radially expand out of the body 18 of the cup 10 so as to compress into sealing engagement with the flange 21 the end 32 of the tube 16 which is compressed and locked between the locking rib 31 and the flange 21. This latter formed sealing rib 33 thus frictionally positions the flange 19 of the cup 10 and the flange 21 of the ferrule on opposite sides of the flange 14 of the coupler 11.

The foregoing method and construction eliminate costly machine screw operations, in that a permanent connection is provided between the coupler 11 and the valve member 10 and ferrule 12 without the use of threads, thereby eliminating entirely threading operations in providing such connection.

It will be readily appreciated that my improved fitting construction and method are simple in operation and construction, resulting in mass production at an economical cost.

While I have shown and described my improved fitting and method of making the same in connection with a hose nozzle, it is to be understood that I am not in any way limiting my invention and the use of my improved fitting and method of making the same, to a hose nozzle.

The various advantages and objects of the invention may be accomplished by modifications of the particular method and embodiment specifically described herein, and it is intended that the appended claims shall include all equivalent arrangements, constructions and methods coming within their call.

Having thus described my invention, what I claim as new and desire to protect by Letters Patent is:

A method of securing a fitting comprising a valve cup having at one end an outwardly turned circumferentially extending flange and at its opposite end an inwardly turned circumferentially extending flange, positioning said valve cup with its major portion within a ferrule having an inwardly turned circumferentially extending flange, providing on a coupler an inwardly turned circumferentially extending flange arranged between the first mentioned flange of the cup and the flange of the ferrule, projecting between the cup and the ferrule one end of a hose, compressing a portion of the hose adjacent the end thereof longitudinally between the cup and the ferrule by forming in the cup within the area of the ferrule a circumferentially extending locking rib, sealing the compressed end of the hose into sealing engagement with the flange of the ferrule by forming in the cup between the locking rib and the flange of the ferrule a sealing rib having a diameter less than the locking rib thereby frictionally positioning the flange of the cup and the flange of the ferrule on opposite sides of the flange of the coupler.

References Cited in the file of this patent

UNITED STATES PATENTS

| | | |
|---|---|---|
| 2,338,666 | Nelson | Jan. 4, 1944 |
| 2,631,047 | Spender | Mar. 10, 1953 |
| 2,634,786 | Stinchcomb | Apr. 14, 1953 |

FOREIGN PATENTS

| | | |
|---|---|---|
| 1,041,159 | France | May 27, 1953 |